(12) United States Patent
You (10) Patent No.: US 12,273,926 B2
(45) Date of Patent: Apr. 8, 2025

(54) RANDOM ACCESS METHOD AND TERMINAL DEVICE

(71) Applicant: GUANGDONG OPPO MOBILE TELECOMMUNICATIONS CORP., LTD., Guangdong (CN)

(72) Inventor: Xin You, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 364 days.

(21) Appl. No.: 17/849,509

(22) Filed: Jun. 24, 2022

(65) Prior Publication Data

US 2022/0330347 A1 Oct. 13, 2022

Related U.S. Application Data

(63) Continuation of application No. PCT/CN2019/129343, filed on Dec. 27, 2019.

(51) Int. Cl.
*H04W 74/0833* (2024.01)
*H04W 56/00* (2009.01)

(52) U.S. Cl.
CPC ... *H04W 74/0833* (2013.01); *H04W 56/0045* (2013.01)

(58) Field of Classification Search
CPC ............ H04W 74/0833; H04W 56/0045
USPC ............................................. 370/329
See application file for complete search history.

(56) References Cited

U.S. PATENT DOCUMENTS

| 11,985,697 | B2 * | 5/2024 | Chen | H04B 7/1853 |
| 2021/0377825 | A1 * | 12/2021 | Deenoo | H04W 48/12 |
| 2022/0021444 | A1 * | 1/2022 | Wei | H04B 7/18508 |
| 2022/0086671 | A1 * | 3/2022 | Hong | H04W 16/28 |
| 2022/0295480 | A1 * | 9/2022 | Xu | H04W 72/0446 |
| 2022/0322274 | A1 * | 10/2022 | Keating | H04W 64/00 |
| 2022/0338230 | A1 * | 10/2022 | Yu | H04L 5/0053 |
| 2022/0417885 | A1 * | 12/2022 | Dai | H04W 56/001 |

FOREIGN PATENT DOCUMENTS

| CN | 109495961 A | 3/2019 |
| CN | 109788548 A | 5/2019 |
| CN | 109842932 A | 6/2019 |

(Continued)

OTHER PUBLICATIONS

Samsung, Uplink timing advance/RACH procedure and initial access for NTN, 3GPP TSG RAN WG1 Meeting #98b R1-1910481, Chongqing, China, Oct. 14, 2019 (Year: 2019).*

(Continued)

*Primary Examiner* — Nicholas R Taylor
*Assistant Examiner* — Chong G Kim
(74) *Attorney, Agent, or Firm* — Ladas & Parry, LLP (57) ABSTRACT

An access control method and a terminal device are provided, which can implement effective random access in an NTN system. The method includes: a terminal device determines a target time advance (TA) in a plurality of TAs according to first information, where the first information is associated with an SSB received by the terminal device and/or is associated with an area where the terminal device is located; and the terminal device sends a first message in a random access procedure to a network device according to the target TA.

13 Claims, 7 Drawing Sheets

700

A terminal device determines a target TA in a plurality of TAs according to first information, where the first information is associated with an SSB received by the terminal device, and/or is associated with an area where the terminal device is located — 710

The terminal device sends a first message in a random access procedure to a network device according to the target TA — 720

(56) References Cited

FOREIGN PATENT DOCUMENTS

| CN | 111093261 A | 5/2020 |
|---|---|---|
| WO | 2018133645 A1 | 7/2018 |
| WO | 2019195457 A1 | 10/2019 |
| WO | 2019231305 A1 | 12/2019 |
| WO | 2021128309 A1 | 12/2019 |

OTHER PUBLICATIONS

International Search Report (ISR) dated Aug. 28, 2020 for Application No. PCT/CN2019/129343.
Written Opinion of the International Searching Authority dated Aug. 24, 2020 for Application No. PCT/CN2019/129343.
ETRI:"Considerations on uplink timing advance and RACH procedure for NTN", 3GPP TSG RAN WG1 #97, R1-1907039, May 17, 2019(May 17, 2019), entire document.
ETRI:"Discussion on timing advance for NTN", 3GPP TSG RAN WG1 #99, R1-1912640, Nov. 22, 2019(Nov. 22, 2019), entire document.
The EESR of corresponding European application application No. 19957386.6 dated on Aug. 10, 2022.
Nokia, Nokia Shanghai Bell, "Considerations on Doppler Compensation, Uplink Timing Advance and Random Access in NTN", R1-1908250, 3GPP TSG RAN WG1 Meeting #98, Prague, Czech Republic, Aug. 26-30, 2019, all pages.

* cited by examiner

A terminal device determines a target TA in a plurality of TAs according to first information, where the first information is associated with an SSB received by the terminal device, and/or is associated with an area where the terminal device is located — 710

The terminal device sends a first message in a random access procedure to a network device according to the target TA — 720

| Area 1 TA1 | Area 2 TA2 | Area 3 TA3 |
|---|---|---|
| Area 4 TA4 | Area 5 TA5 | Area 6 TA6 |
| Area 7 TA8 | Area 8 TA8 | Area 9 TA9 |

RANDOM ACCESS METHOD AND TERMINAL DEVICE

CROSS-REFERENCE TO RELATED APPLICATIONS

This application is a continuation of International Application No. PCT/CN2019/129343, filed on Dec. 27, 2019, the content of which is hereby incorporated by reference in its entirety.

TECHNICAL FIELD

Embodiments of the present application relate to the technical field of communications, and in particular, to a random access method and a terminal device.

BACKGROUND

A non-terrestrial network (Non Terrestrial Network, NTN) system provides a communication service for a terrestrial user by means of satellite communication, and a distance between a terminal device and a satellite is large, and a signal transmission delay between the terminal device and the satellite is greatly increased. In a random access procedure, in order to enable a network device to receive a preamble sent by a terminal, and determine a timing advance (Timing Advance, TA) adjustment amount for the terminal device, a length of a receiving window for the network device to receive the preamble needs to be increased. This not only increases implementation complexity of the network device, but also reduces capacity of a random access channel. Therefore, how to implement effective random access in the NTN system becomes an urgent problem to be solved.

SUMMARY

Embodiments of the present application provide a random access method and a terminal device, which can implement effective random access in an NTN system.

According to a first aspect, a random access method is provided, including: determining, by a terminal device, a target time advance (TA) in a plurality of TAs according to first information, where the first information is associated with an SSB received by the terminal device and/or is associated with an area where the terminal device is located; and sending, by the terminal device, a first message in a random access procedure to a network device according to the target TA.

According to a second aspect, a terminal device is provided, where the terminal device can execute the method of the first aspect or any optional implementation of the first aspect. Specifically, the terminal device includes a functional module configured to execute the method of the first aspect or any possible implementation of the first aspect.

According to a third aspect, a terminal device is provided, including a processor and a memory, where the memory is configured to store a computer program, and the processor is configured to invoke and run the computer program stored in the memory, so as to execute the method of the first aspect or any possible implementation of the first aspect.

According to a fourth aspect, an apparatus for random access is provided, including a processor, where the processor is configured to invoke and run a computer program from a memory, to cause a device installed with the apparatus to execute the method of the first aspect or any possible implementation of the first aspect. The apparatus is, for example, a chip.

According to a fifth aspect, a computer readable storage medium is provided, and is configured to store a computer program, where the computer program causes a computer to execute the method of the first aspect or any possible implementation of the first aspect.

According to a sixth aspect, a computer program product is provided, including computer program instructions, which cause a computer to execute the method of the first aspect or any possible implementation of the first aspect.

According to a seventh aspect, a computer program is provided, which, when run on a computer, causes the computer to execute the method of the first aspect or any possible implementation of the first aspect.

Based on the above technical solutions, since terminal devices are divided based on an SSB index or an area where the terminal devices are located, different TAs are used for terminal devices corresponding to different SSB indexes or different areas. Therefore, for a terminal device corresponding to each SSB index or each area, a distance difference between the terminal devices closest to and farthest from the network device is smaller than a distance difference between the terminal devices closest to and farthest from the network device in a whole cell, and accordingly, a maximum delay difference can also be significantly reduced. In this way, a length of a receiving window used by the network device to receive a preamble can be reduced, and implementation complexity of the network device is reduced. Furthermore, the terminal devices with different SSB indexes or the terminal devices in different areas use different TAs to send preambles, and in this way, the effective random access in the NTN system is implemented without increasing the length of the receiving window.

DESCRIPTION OF EMBODIMENTS

Hereinafter, technical solutions in embodiments of the present application will be described with reference to accompanying drawings.

The technical solutions of the embodiments of the present application may be applied to various communication systems, such as a long term evolution (LTE) system, an LTE frequency division duplex (FDD) system, an LTE time division duplex (TDD) system, an advanced long term evolution (LTE-A) system, a new radio (NR) system, an evolution system of the NR system, an LTE-based access to unlicensed spectrum (LTE-U) system, an NR-based access to unlicensed spectrum (NR-U) system, a universal mobile telecommunication system (UMTS), wireless local area networks (WLAN), wireless fidelity (WiFi), a future 5G system or other communication systems, etc.

Generally, a quantity of connections supported by a conventional communication system is limited, which is easy to implement. However, with the development of communication technology, a mobile communication system not only supports traditional communication, but also supports device-to-device (D2D) communication, machine-to-machine (M2M) communication, and machine-type communication (MTC) and vehicle-to-vehicle (V2V) communication, etc. The embodiments of the present application may also be applied to these communication systems.

Figure 1:
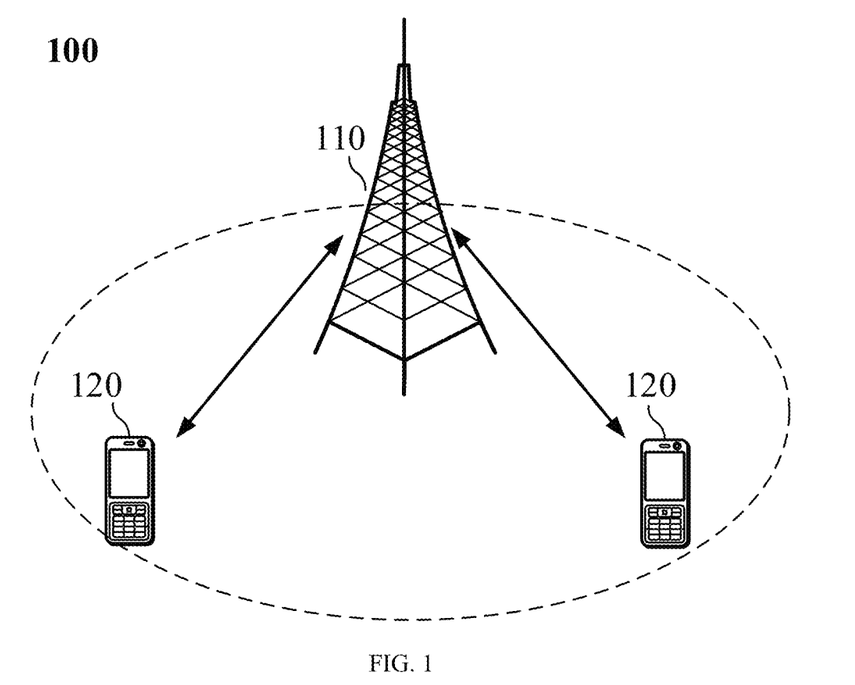
FIG. 1 is a schematic diagram of a possible wireless communication system to which an embodiment of the present application is applied.

Illustratively, a communication system 100 to which an embodiment of the present application is applied is shown in FIG. 1. The communication system 100 includes a network device 110 and at least one terminal device 120 located within a coverage area of the network device 110. The network device 110 may provide communication coverage for a particular geographic area and may communicate with the terminal device located within the coverage area. The terminal device 120 may communicate with the network device 110 via electromagnetic waves.

The network device 110 may be an evolutional base station (Evolutional Node B, eNB or eNode B) in an LTE system, or a radio controller in a cloud radio access network (CRAN), or the network device 110 may be a relay station, an access point, a vehicle-mounted device, a wearable device, a future network-side device, or a network device in a future evolved public land mobile network (PLMN), or the like.

The terminal device 120 may be mobile or fixed. For example, the terminal device may refer to an access terminal, user equipment (UE), a user unit, a user station, a mobile station, a remote station, a remote terminal, a mobile device, a user terminal, a terminal, a wireless communication device, a user proxy, or a user apparatus. The access terminal may be a cellular telephone, a cordless telephone, a session initiation protocol (SIP) telephone, a wireless local loop (WLL) station, a personal digital assistant (PDA), a handheld device with a wireless communication function, a computing device or other processing devices connected to a wireless modem, a vehicle-mounted device, a wearable device, a future terminal device, or a terminal device in a future evolved PLMN, etc.

FIG. 1 illustratively shows one network device and two terminal devices, but the present application is not limited thereto. The communication system 100 may include a plurality of network devices, and other quantity of terminal devices may be included within coverage of each network device. In addition, the communication system 100 may include other network entities such as a network controller, a mobility management entity, and the like.

The embodiments of the present application can be applied to a non-terrestrial network (NTN) system. In this case, the network device 110 in FIG. 1 can communicate with the terminal device through a satellite, or the network device 110 itself is a satellite.

In the NTN system, a communication service is provided to a terrestrial user by means of a satellite communication. Compared with terrestrial cellular network communication, satellite communication has many unique advantages. Firstly, the satellite communication is not limited by a geographic area of a user, for example, general terrestrial communication cannot cover areas such as oceans, mountains, deserts and the like where a communication device cannot be set up or areas that are covered due to a sparse population. But for the satellite communication, a satellite may cover relatively large ground, and the satellite may perform an orbital movement around the earth, and thus each corner on the earth can be covered by the satellite communication theoretically. Secondly, the satellite communication has a large social value. The satellite communication can cover remote mountainous areas and poor and backward countries or regions at a low cost, so that people in these regions can enjoy advanced voice communications and mobile Internet technologies, which is beneficial to narrow a digital divide with developed regions and to promote development of these regions. Thirdly, a distance of the satellite communication is far and communication cost is not significantly increased when a communication distance is increased. Finally, the satellite communication has high stability and is not limited by natural disasters.

According to a difference in orbit height, communication satellites are divided into a low-earth orbit (LEO) satellite, a medium-earth orbit (MEO) satellite, a geostationary earth orbit (GEO) satellite, a high elliptical orbit (HEO) satellite, etc. The main research at this stage is the LEO satellite and the GEO satellite, where an altitude range of the LEO satellite is 500 km to 1500 km and a corresponding orbital period is about 1.5 hours to 2 hours. A signal propagation delay of single-hop communication between users is generally less than 20 ms. The maximum satellite viewing time is 20 minutes, a signal propagation distance is short, link loss is small, and a requirement of transmission power for a user terminal is not high. An orbital altitude of the GEO satellite is 35786 km and a rotation period around the earth is 24 hours, and the signal propagation delay of single-hop communication between users is generally 250 ms.

In order to ensure the coverage of the satellite and improve system capacity of the whole satellite communication system, the satellite adopts multiple beams to cover the ground, and one satellite can form dozens or even hundreds of beams to cover the ground. One satellite beam can cover a terrestrial area of dozens to hundreds of kilometers in diameter.

After a cell search process, the terminal device has acquired downlink synchronization with a cell, and therefore, the terminal device can receive downlink data. However, the terminal device can perform uplink transmission only by acquiring uplink synchronization with the cell. The terminal device can establish a connection with the cell and acquire the uplink synchronization through a random access (RA) procedure. That is to say, the terminal device can acquire the uplink synchronization through random access, and may also acquire a unique identity allocated by the network device, that is, a cell radio network temporary identity (C-RNTI).

The random access procedure may include a 4-step random access procedure and a 2-step random access procedure. The 4-step random access procedure and the 2-step random access procedure are described below with reference to FIG. 2 and FIG. 3.

The 4-step random access and the 2-step random access may generally be triggered by the following several types of trigger events.

(1) Initial access

The terminal device transforms from a radio resource control idle state (RRC IDLE state) to an RRC connection state (RRC CONNECTED state).

(2) Handover

In this case, the terminal device needs to establish uplink synchronization with a new cell.

(3) RRC Connection Re-establishment procedure

After a radio link failure (Radio Link Failure, RLF) occurs on the terminal device, a radio connection is re-established.

(4) When in the RRC connection state, downlink data arrives, and the uplink is in an "out-of-synchronization" state.

(5) When in the RRC connection state, uplink data arrives, and the uplink is in the "out-of-synchronization" state or there is no available physical uplink control channel (Physical Uplink Control Channel, PUCCH) resource for sending a scheduling request (Scheduling Request, SR).

(6) SR failure (7) A synchronization reconfiguration request is received from RRC.

(8) The terminal device transforms from an RRC inactive state (RRC INACTIVE state) to an RRC CONNECTED state.

(9) A time calibration is established during a process of adding a secondary cell (Secondary Cell, SCell).

(10) Other system information (System Information, SI) is requested.

(11) Beam failure recovery.

In the embodiment of the present application, a first message to a fourth message in the 4-step random access procedure are respectively denoted as (Message, Msg) 1 (Msg 1), Msg 2, Msg 3 and Msg 4, and a first message and a second message in the 2-step random access procedure are respectively denoted as Msg A and Msg B.

Figure 2:
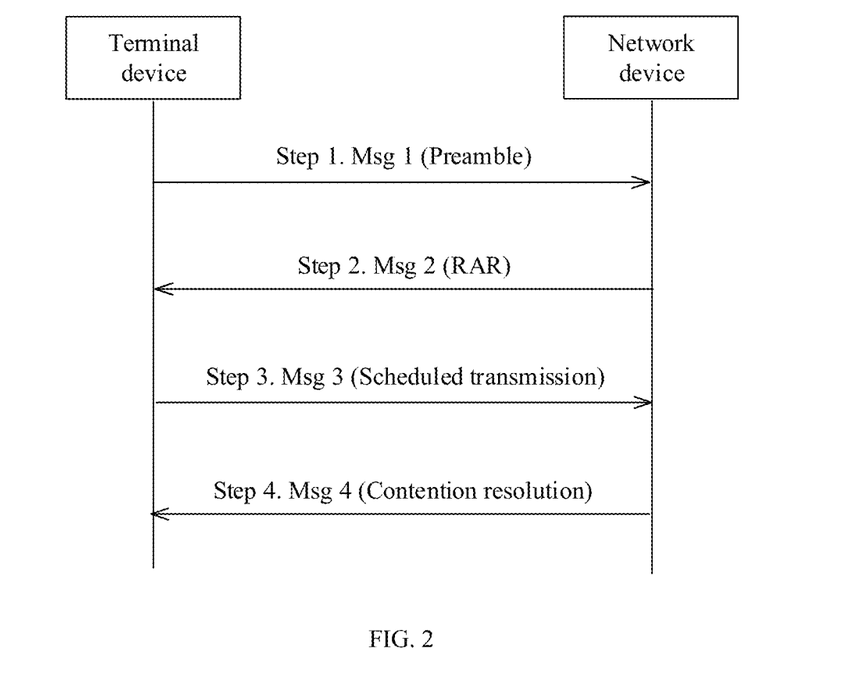
FIG. 2 is a schematic diagram of a 4-step random access procedure.

FIG. 2 is a flow interaction diagram of 4-step random access. As shown in FIG. 2, the flow of the 4-step random access may include the following four steps.

Step 1, a terminal device sends Msg1 to a network device.

The terminal device selects a physical random access channel (PRACH) resource, and sends a selected random access preamble (RAP) (or referred to as a preamble, a random access preamble sequence, a preamble sequence, and the like) on the selected PRACH resource.

For non-contention-based random access, the PRACH resource and the preamble may be specified by the network device. The network device estimates uplink timing and size of uplink grant required for a terminal to transmit Msg 3 based on the preamble.

Step 2: the network device sends Msg 2 to the terminal device.

After the terminal device sends Msg 1, a random access response time window (ra-ResponseWindow) is enabled. The terminal device monitors a PDCCH scrambled by a random access radio network temporary identity (RA-RNTI) within the time window, where the RA-RNTI is related to the PRACH resource used by the terminal device to transmit Msg 1.

After receiving the PDCCH scrambled by the RA-RNTI successfully, the terminal device can obtain a physical downlink shared channel (PDSCH) scheduled by the PDCCH, which includes a random access response (RAR) message.

The RAR includes, for example, the following information:

a backoff indicator (BI), which is carried in a subheader of the RAR, and is used for indicating backoff time of retransmitting Msg1;

a random access preamble identity (RAPID), which is used for a network device to respond to a received preamble index;

a timing advance group (TAG), which is carried in a payload of the RAR for adjusting uplink timing;

uplink grant (UL grant) for scheduling an uplink resource indication of Msg 3; and a temporary cell radio network temporary identifier (Temporary C-RNTI), which is used for scrambling the PDCCH of Msg 4 during an initial access.

If a terminal has received the PDCCH scrambled by the RAR-RNTI, and the RAR includes a preamble index transmitted by the terminal, the terminal device considers that Msg 2 is successfully received.

For the non-contention-based random access, after the terminal device successfully receives Msg 2, the random access procedure ends. For a contention-based random access, after receiving Msg 2 successfully, the terminal also needs to continue to transmit Msg 3 and receive Msg 4.

Step 3, the terminal device sends Msg 3 to the network device.

The terminal device transmits Msg 3 on a resource scheduled by the network device, and Msg 3 is used for notifying the network device by which event the random access procedure is triggered. For example, if it is an initial access, the terminal device carries an identity (UE ID) of the terminal device and an establishment cause in Msg 3. If it is an RRC re-establishment, the terminal device carries an identity of UE in the connected state and an establishment cause (establishment cause) in Msg 3.

Step 4, the network device sends Msg 4 to the terminal device.

Msg 4 has two functions, one is for contention conflict resolution, and the other is for the network device to transmit an RRC configuration message to the terminal device. The contention conflict resolution has the following two ways: if the UE carries the C-RNTI in Msg 3, Msg 4 is scheduled by a PDCCH scrambled by the C-RNTI. If the terminal device does not carry the C-RNTI in Msg 3, for example, in the initial access, Msg 4 is scheduled by a PDCCH scrambled by a temporary cell-radio network temporary identity (TC-RNTI), and a conflict solution is that the terminal device receives the PDSCH of Msg 4 by matching a service data unit (SDU) of a common control channel (Common Control Channel, CCH) in the PDSCH.

It can be seen that a main purpose of the random access is that the terminal device acquires the uplink synchronization with the cell. In the random access procedure, the network device can learn a moment when the terminal device sends a preamble according to the PRACH resource used by the terminal device to send the preamble, thereby determining an initial TA of the terminal device according to a sending moment and a receiving moment of the preamble, and informing the terminal device via the RAR.

Figure 3:
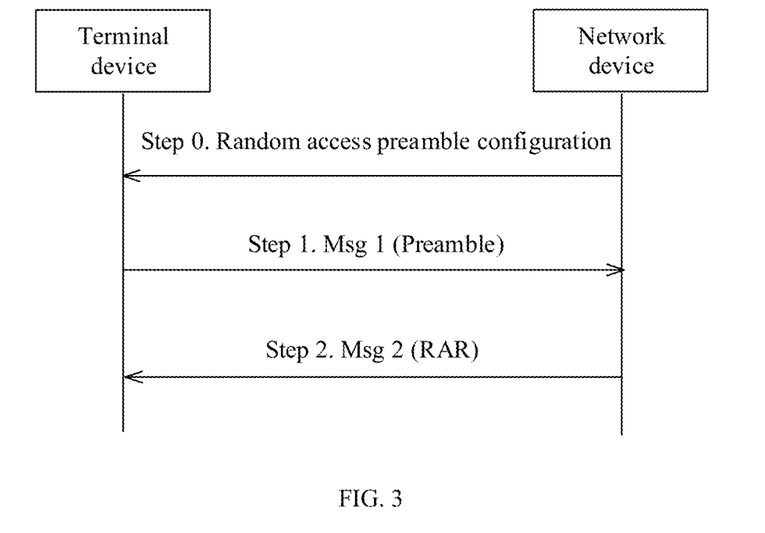
FIG. 3 is a schematic diagram of a non-contention-based random access procedure.

The method in the embodiments of the present application may be applied to a contention-based random access procedure (contention based RACH) and a non-contention-based random access procedure (contention free RACH). FIG. 2 shows a contention-based random access procedure. For a non-contention-based random access procedure, for example, as shown in FIG. 3, after the terminal device successfully receives Msg 2, the random access procedure ends.

There is a large delay in the 4-step random access procedure, and therefore, in the NR, the terminal device can also initiate the 2-step random access procedure to adapt to a service of low-latency and high-reliability, and reduce the delay of the random access.

In brief, in the 2-step random access procedure, Msg 1 and Msg 3 in the 4-step random access procedure can be combined into Msg A in the 2-step random access procedure, and Msg 2 and Msg 4 in the 4-step random access procedure can be combined into Msg B in the 2-step random access procedure.

Figure 4:
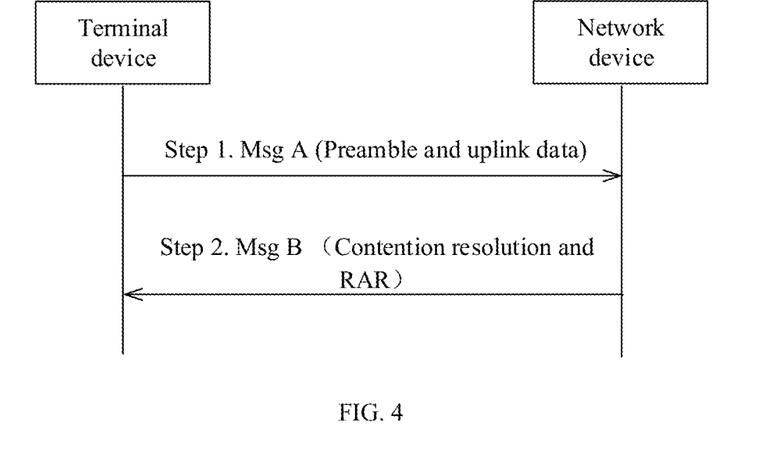
FIG. 4 is a schematic diagram of a 2-step random access procedure.

For example, as shown in FIG. 4, in Step 1, a terminal device sends Msg A to a network device, where Msg A includes a preamble carried on a PRACH and payload information carried on a PUSCH. In Step 2, the network device sends Msg B to the terminal device. After sending Msg A, the terminal device monitors a response message sent by the network device within a random access response time window, and if an indication of success in contention conflict resolution sent by the network device is received, the terminal device ends the random access procedure.

It should be understood that FIG. 2 to FIG. 4 are merely examples. Msg A may include some or all of the information carried in Msg 1 and Msg 3, or may also include other information. Msg B may include some or all of the information carried in Msg 2 and Msg 4, or may also include other information.

Since the 2-step random access procedure has not entered a standardization phase, FIG. 4 is only taken as an example for description herein, and other possibilities exist for a definition of each random access message involved therein, and other definitions for each random access message in the 2-step random access procedure are not limited. The method described in the embodiments of the present application is applicable to all other 2-step random access procedures.

Currently, a coverage area of the NR system is small, and a difference in a signal transmission delay between terminal devices at different positions and the network device is not great in a same cell. In the random access procedure, when the terminal devices send preambles, for different terminal devices using a same RACH resource, namely, a same RACH occasion (RACH Occasion, RO), times when the preambles sent by the terminal devices arrive at the network device are within one receiving window. In this way, after receiving the preambles, the network device may determine a time when the terminal devices send the preambles, so as to determine a TA adjustment amount for the terminal devices.

However, in the NTN, the signal transmission delay between the terminal device and the satellite greatly increases. In addition, since the coverage of the satellite is large, for different terminal devices within the coverage of the same satellite, due to their different positions, a large difference may also exist in the signal transmission delays between the terminal devices and the satellite. A maximum difference of signal transmission delays between different terminal devices and the network device in one NTN cell is 10.3 ms. Such a large difference in signal transmission delay will result in that the preambles sent by different terminal devices using the same RO arrive at the network device at different times. In order to ensure that the network device can receive the preambles sent by different terminal devices in the cell, the length of the receiving window of the network device should be extended to twice of a maximum delay difference, and here, "twice" is because downlink timing of the terminal device has an offset of one delay with respect to the network device. The maximum delay difference=a maximum unidirectional delay−a minimum unidirectional delay, and the unidirectional delay is a signal transmission delay between a terminal device and a network device.

Figure 5:
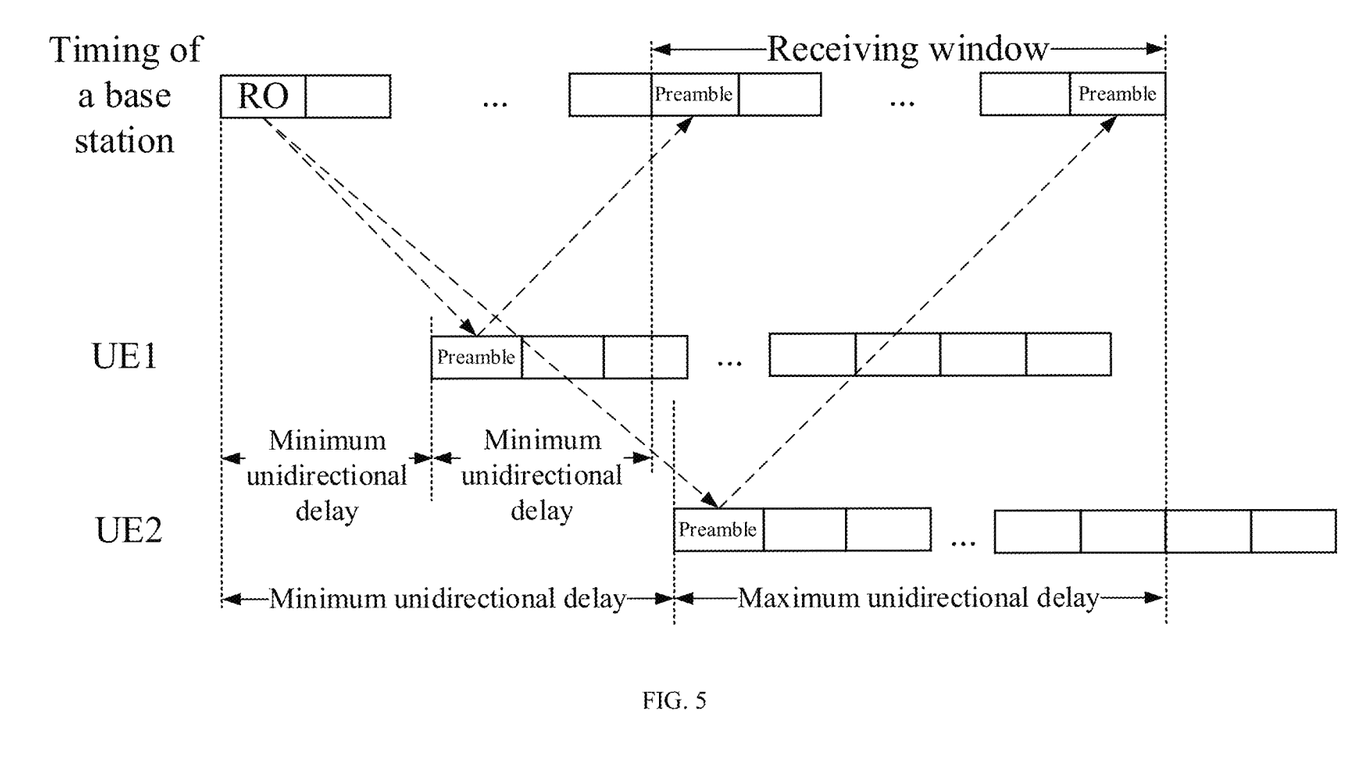
FIG. 5 is a schematic diagram of a receiving window for receiving a preamble in an NTN.

For example, as shown in FIG. 5, UE1 is a terminal device closest to a network device in a cell, and UE2 is a terminal device farthest from the network device in the cell. A delay between UE2 and the network device is a maximum unidirectional delay of the cell, and a delay between UE1 and the network device is a minimum unidirectional delay of the cell. An RO is used for the terminal device to send a preamble, a receiving window for the network device to receive the preamble has a corresponding relationship with the RO, and the network device can determine a position of the RO where the terminal device sends the preamble according to a position of the receiving window for receiving the preamble, and thus use this to determine a TA adjustment amount for the terminal device. In the embodiment of the present application, the receiving window of the preamble is simply referred to as a receiving window. UE1 and UE2 send preambles on the same RO, but since UE1 is closest to the network device, UE2 is farthest from the network device, and delays between UE1, UE2 and the network device are different from each other. Therefore, the network device receives the preambles sent by UE1 and UE2 at position T1 and position T2 respectively. In this case, the length of the receiving window should be set to at least 2*(the maximum unidirectional delay−the minimum unidirectional delay), so as to ensure that the preambles sent in the same RO are received in the same receiving window.

Figure 6:
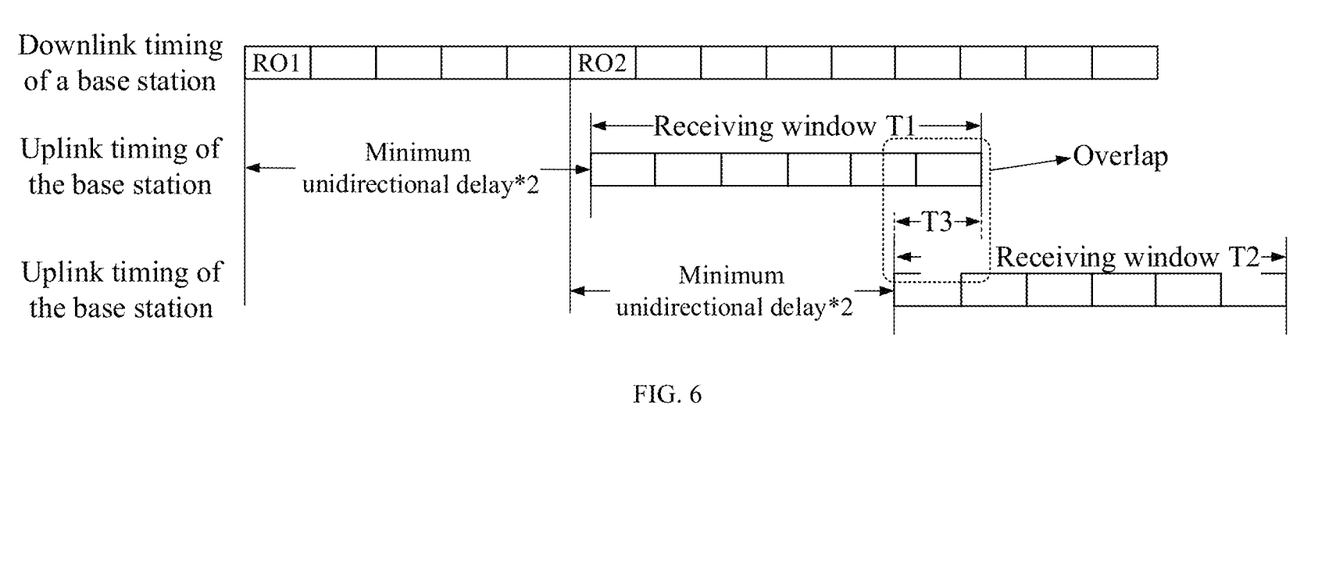
FIG. 6 is a schematic diagram of overlapping of receiving windows in an NTN.

However, setting the receiving window to be long may cause other problems. For example, as shown in FIG. 6, after receiving a preamble, the network device needs to know on which RO the terminal device sends the preamble, thereby determining an initial TA of the terminal device. Since a long receiving window needs to be introduced, if a time interval between adjacent ROs in a time domain is less than a length of a receiving window, receiving windows corresponding to ROs at different time positions overlap in the time domain. As shown in FIG. 6, a receiving window corresponding to RO1 is at a position shown as T1, and a receiving window corresponding to RO2 which is adjacent to RO1 is at a position shown as T2, where a distance between RO1 and a receiving window T1 is a minimum unidirectional delay*2, and a distance between RO2 and a receiving window T2 is a minimum unidirectional delay*2, T1=T2=a maximum delay difference*2, and the maximum delay difference=a maximum unidirectional delay-a minimum unidirectional delay. If an interval between RO1 and RO2 is small, T1 and T2 generate an overlap area T3. If the network device receives a preamble sent by the terminal device in the overlap area T3, it is impossible to determine whether the terminal device sends the preamble in RO1 or RO2, and it is impossible to determine the initial TA for the terminal device.

In order to avoid the problem shown in FIG. 6, when configuring a RACH resource, the network device may ensure that the time interval between adjacent ROs in the time domain is not less than the length of the receiving window, but this manner will reduce RACH capacity and affect performance of the random access.

It can be seen that, the length of the receiving window for the network device to receive a preamble needs to be extended in the NTN, and the length of the receiving window is directly related to a coverage area of an NTN cell, the larger the coverage area of a cell, the longer the length of the receiving window needs to be supported. For a GEO scenario, a preamble receiving window of up to 20.6 ms needs to be supported. The extension of the length of the receiving window, on the one hand, brings a great challenge to the implementation of the network device; and on the other hand, if the problem generated in FIG. 5 is avoided by increasing the time interval between adjacent ROs, the RACH capacity will be decreased.

To this end, an embodiment of the present application provides a random access method, which can implement effective random access in an NTN system, and does not increase a length of a receiving window.

A network device in the embodiment of the present application may be a satellite or a terrestrial station, such as a base station.

When the network device is the satellite, a distance between a terminal device and the network device is a distance between the terminal device and the satellite. When the network device is the terrestrial station, the distance between the terminal device and the network device is a sum of a distance between the terminal device and the satellite, and a distance between the satellite and the terrestrial station.

For example, in a case of a transparent GEO/LEO, the satellite can realize a function of the base station, and therefore the network device is the satellite, or in other words, the satellite communicates with the terminal device as the network device. In this case, the distance between the terminal device and the network device is the distance between the terminal device and the satellite. For another example, in a case of a regenerative GEO/LEO, uplink data from the terminal device is sent to the terrestrial station through the satellite, and downlink data from the terrestrial station is sent to the terminal device through the satellite, and therefore the network device is the terrestrial station. In this case, the distance between the terminal device and the network device includes a sum of the distance between the terminal device and the satellite, and the distance between the satellite and the terrestrial station. After receiving a measurement report reported by the terminal device, the satellite forwards the measurement report to the terrestrial station.

For a case of LEO, the satellite is mobile, the distance between the satellite and the terrestrial station is also changing; for a case of GEO, the satellite is immobile, and the distance between the satellite and the terrestrial station is fixed.

Figure 7:
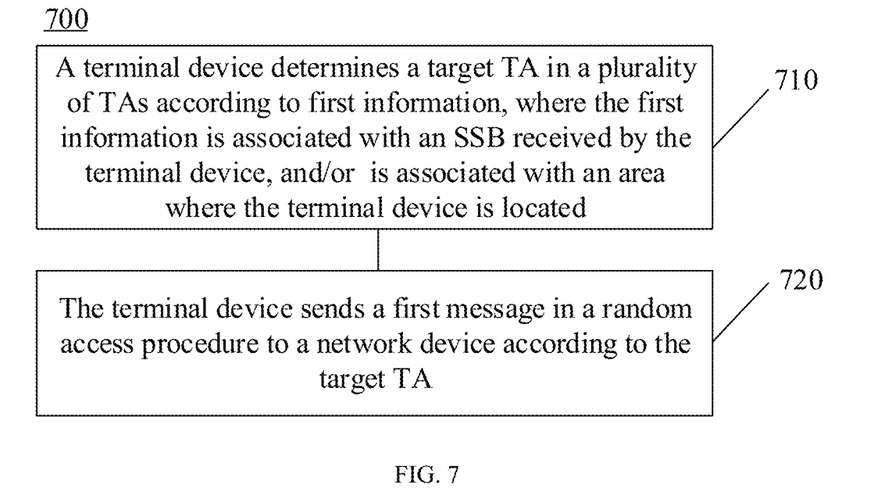
FIG. 7 is a schematic flowchart of a random access method according to an embodiment of the present application.

FIG. 7 is a schematic flowchart of a random access method according to an embodiment of the present application. The method shown in FIG. 7 may be executed by a terminal device. The method may be applied to any random access procedure, for example, a 2-step random access procedure or a 4-step random access procedure, and may be applied to a contention-based random access procedure and a non-contention-based random access procedure. The terminal device may be, for example, a terminal device 120 shown in FIG. 1. As shown in FIG. 7, the method includes some or all of the following steps.

In 710, a terminal device determines a target TA in a plurality of TAs according to first information.

The first information is associated with a synchronization signal block (Synchronizing Signal/PBCH Block, SSB, SS Block or SS/PBCH Block) received by the terminal device, and/or the first information is associated with an area where the terminal device is located.

In 720, the terminal device sends a first message in a random access procedure to a network device according to the target TA.

In an implementation, the first information is associated with an SSB received by the terminal device.

For example, the first information includes an SSB index of the SSB received by the terminal device.

In this case, the plurality of TAs in 710 respectively correspond to a plurality of SSB indexes. The terminal device determines a TA corresponding to the SSB index as the target TA according to the SSB index of the received SSB and a corresponding relationship between the plurality of TAs and the plurality of SSB indexes.

In this embodiment, the TA is a common TA. Different SSB indexes correspond to different common TAs. Terminal devices which detect an SSB with a same SSB index send either Msg 1 or Msg A using a same common TA. The terminal device selects a target TA among a plurality of TAs based on the received SSB, and sends Msg 1 or Msg A to the network device using the target TA. The network device may broadcast information of the plurality of TAs to the terminal device.

It should be understood that, the plurality of TAs respectively correspond to the plurality of SSB indexes, which may be that the plurality of TAs correspond to the plurality of SSB indexes on a one-to-one basis, or may be that one TA corresponds to one or more SSB indexes, or may be that one SSB index corresponds to one or more TAs, and the embodiments of the present application do not put a limitation on this. Description will be given below by taking an example where the plurality of TAs have a one-to-one correspondence with the plurality of SSB indexes.

For example, as shown in Table 1, TA1 to $TA_n$ correspond to SSB index 1 to SSB index n on a one-to-one basis. If the SSB index of the SSB received by the terminal device is SSB index 1, the terminal device determines that the target TA is TA1. If it is SSB index 2, then the target TA is TA2, . . . , and if it is SSB index n, then the target TA is $TA_n$.

TABLE 1

| SSB Index | TA |
|---|---|
| SSB index 1 | TA1 |
| SSB index 2 | TA1 |
| . . . | . . . |
| SSB index n | $TA_n$ |

The SSB includes a physical broadcast channel (Physical Broadcast Channel, PBCH), and the PBCH carries an SSB index of the SSB. The terminal device may acquire the SSB index from the PBCH in the received SSB.

In an embodiment, a measurement value of the SSB received by the terminal device is greater than a preset threshold. For example, a measurement value of reference signal receiving power (RSRP) and/or reference signal receiving quality (RSRQ) of the SSB is greater than a corresponding preset threshold.

The terminal device measures the SSB, and if the RSRP of the SSB is greater than a preset RSRP threshold and/or the RSRQ of the SSB is greater than a preset RSRQ threshold, the terminal device considers that a TA corresponding to the SSB index of the SSB is the target TA.

When configuring the plurality of TAs, the network device may configure a preset threshold, for example, configure an RSRP threshold and/or an RSRQ threshold. For example, in Table 1, taking the RSRP as an example, if an SSB index of an SSB received by the terminal device is SSB index 1, and the RSRP of the SSB is greater than the RSRP threshold, the terminal device determines that the target TA is TA1; if it is SSB index 2 and the RSRP of the SSB is greater than the RSRP threshold, the terminal device determines that the target TA is TA2; and if it is SSB index n, and the RSRP of the SSB is greater than the RSRP threshold, the terminal device determines that the target TA is $TA_n$.

Assuming that the terminal device is located at a boundary between an area corresponding to SSB index 1 and an area corresponding to the SSB index 2, the terminal device may detect an SSB of SSB index 1 and an SSB of SSB index 2, and at this time, the terminal device selects an SSB with a measurement value greater than the preset threshold, and selects a corresponding TA according to the SSB index thereof.

In an embodiment, the network device may also configure a plurality of thresholds, for example, as shown in Table 2, taking RSRP as an example, n TAs correspond to n SSB indexes and correspond to n RSRP thresholds. These n RSRP thresholds may be all or partially the same or all different. According to Table 2, if the SSB index of the SSB received by the terminal device is SSB index 1, and the RSRP of the SSB is greater than RSRP threshold 1, the terminal device determines that the target TA is TA1; if the SSB index of the SSB is SSB index 2 and the RSRP of the SSB is greater than RSRP threshold 2, the terminal device determines that the target TA is TA2 . . . and if the SSB index of the SSB is SSB index n, and the RSRP of the SSB is greater than RSRP threshold n, the terminal device determines that the target TA is $TA_n$.

TABLE 2

| SSB Index | TA | RSRP Threshold |
| --- | --- | --- |
| SSB index 1 | TA1 | RSRP threshold 1 |
| SSB index 2 | TA1 | RSRP threshold 2 |
| . . . | . . . | . . . |
| SSB index n | $TA_n$ | RSRP threshold n |

The corresponding relationship between the plurality of SSB indexes and the plurality of TAs may be sent by the network device to the terminal device, or may be preconfigured, for example, agreed in a protocol. The terminal device may receive indication information sent by the network device, where the indication information is used for indicating the corresponding relationship; or the terminal device acquires the corresponding relationship which is pre-stored.

The corresponding relationship may be explicit, for example, as shown in Table 1, which is indicated by the network device to the terminal device or agreed in advance. Or, the corresponding relationship may be implicit, the network device may broadcast the plurality of TAs to the terminal device, and the terminal device determines a target TA based on an implicit relationship. For example, a plurality of SSB indexes from small to large or from large to small may correspond to a plurality of TAs from small to large or from large to small sequentially. In addition, other implicit indication manners may be adopted, which is not limited herein.

In another implementation, the first information is associated with an area where the terminal device is located.

For example, a cell where the terminal device is located includes a plurality of areas, and the plurality of TAs in 710 respectively correspond to the plurality of areas, and the first information includes information about a target area where the terminal device is located in the plurality of areas. The terminal device determines a TA corresponding to the target area as the target TA according to the target area and a corresponding relationship between the plurality of TAs and the plurality of areas.

In this embodiment, the terminal device has a positioning capability. The terminal device may determine its position based on the positioning capability, and determine in which area of the plurality of areas it is located according to the information about the plurality of areas. The TA is a common TA. Different areas in the cell correspond to different common TAs. Terminal devices located in the same area use the same common TA to send Msg 1 or Msg A. Based on the positioning capability, the terminal device determines the target area where it is located in the plurality of areas, and sends Msg 1 or Msg A to the network device using the TA corresponding to the target area.

It should be understood that, the cell is divided into a plurality of areas. The plurality of TAs respectively correspond to the plurality of areas, which may be that the plurality of TAs may correspond to a plurality of areas on a one-to-one basis, or may be that one TA corresponds to one or more areas, or may be that one area corresponds to one or more TAs, and the embodiments of the present application do not put a limitation on this. Hereinafter, description is made by taking an example where the plurality of TAs have a one-to-one correspondence with the plurality of areas.

For example, as shown in Table 3, TA1 to $TA_n$ correspond to Area 1 to Area n in the cell on a one-to-one basis. If the terminal device determines that it is located in Area 1, the terminal device determines that the target TA is TA1; if the terminal device determines that it is located Area 2, the terminal device determines that the target TA is TA2 . . . ; and if the terminal device determines that it is located in Area n, the terminal device determines that the target TA is $TA_n$.

TABLE 3

| Area | TA |
| --- | --- |
| Area 1 | TA1 |
| Area 2 | TA2 |
| . . . | . . . |
| Area n | $TA_n$ |

The corresponding relationship between the plurality of areas and the plurality of TAs may be sent by the network device to the terminal device, or may be preconfigured, for example, agreed in a protocol. The terminal device may receive indication information sent by the network device, where the indication information is used for indicating the corresponding relationship; or the terminal device acquires the corresponding relationship which is pre-stored.

The corresponding relationship may be explicit, for example, as shown in Table 1, which is indicated by the network device to the terminal device or agreed in advance. Or, the corresponding relationship may be implicit, the network device may broadcast the plurality of TAs to the terminal device, and the terminal device determines a target TA based on an implicit relationship. For example, a plurality of SSB indexes from small to large or from large to small may correspond to a plurality of TAs from small to large or from large to small sequentially. In addition, other implicit indication manners may be adopted, which is not limited herein.

The embodiment of the present application does not limit a manner of dividing an area.

In an implementation, the plurality of areas may be coverage areas of a plurality of SSBs with different SSB indexes respectively. A coverage area of an SSB may be understood as an area covered by a beam corresponding to the SSB, and different beams cover different areas. Therefore, a cell may be divided into a plurality of areas according to deployment of SSBs.

Figure 8:
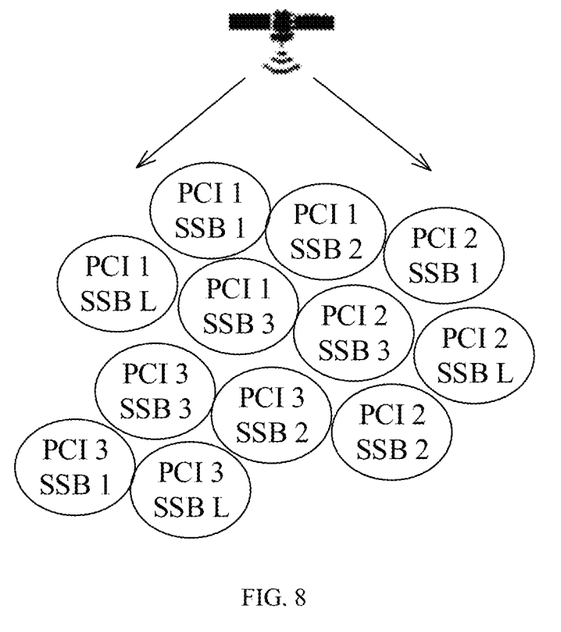
FIG. 8 is a schematic diagram of a plurality of areas divided according to an SSB index according to an embodiment of the present application.

For example, as shown in FIG. 8, physical cell identifiers (Physical Cell Identifier, PCI) of Cell 1, Cell 2 and Cell 3 are PCI 1, PCI 2 and PCI 3, respectively. Taking Cell 1 as an example, Cell 1 includes Area 1 to Area 4, where Area 1 is an area covered by the SSB of SSB index 1, and Area 1 corresponds to TA1; Area 2 is an area covered by the SSB of SSB index 2, and Area 2 corresponds to TA2; Area 3 is an area covered by the SSB of the SSB index 3, and Area 3 corresponds to TA3; and Area 4 is an area covered by the SSB of SSB index L, and Area 4 corresponds to TA4. The terminal device receives an SSB, and if the PBCH carries SSB index 1, the terminal device sends Msg 1 or Msg A by using TA1; if the PBCH carries SSB index 2, the terminal device sends Msg 1 or Msg A by using TA2; if the PBCH carries SSB index 3, the terminal device sends Msg 1 or Msg A by using TA3; and if the PBCH carries SSB index L, the terminal device sends Msg 1 or Msg A by using TA4.

In another implementation, the cell may be divided into a plurality of areas according to a measurement value of a reference signal. The plurality of areas respectively correspond to a plurality of value ranges, and the target area where the terminal device is located is an area corresponding to a value range where the measurement value of the SSB is located. The measurement value is, for example, a measurement value of the RSRP and/or the RSRQ, etc.

For N areas, N−1 thresholds may be set, which are respectively Thresholds 1 to N−1. An area with a measurement value of the SSB≤Threshold 1 is Area 1, an area with Threshold 1≤a measurement value of the SSB≤Threshold 2 is Area 2, . . . , an area with Threshold i−1≤a measurement value of the SSB≤Threshold i is Area i, where 1<i≤ N−1, . . . , and an area with a measurement value of the SSB≥Threshold N−1 is Area N.

In yet another implementation, the plurality of areas in the cell may be configured by the network device.

Figure 9:
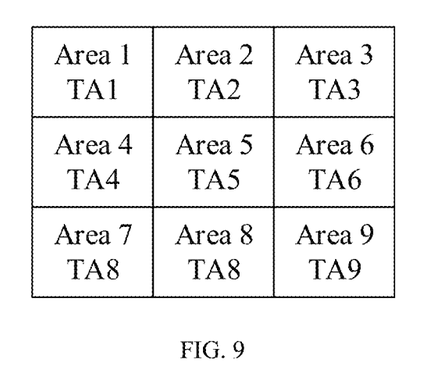
FIG. 9 is a schematic diagram of a plurality of areas configured by a network device according to an embodiment of the present application.

For example, as shown in FIG. 9, the network device configures the plurality of areas in the cell which include Areas 1 to 9, and Areas 1 to 9 respectively correspond to TA1 to TA9. The terminal device determines a current area based on its positioning capability, and sends Msg 1 or Msg A by using a TA corresponding to the area. For example, if the terminal device is currently in Area 2, Msg 1 or the Msg A is sent by using TA2 corresponding to Area 2.

In addition, the cell may be divided into a plurality of areas in other manners.

The terminal device may acquire information of the plurality of areas from, for example, a satellite ephemeris or a network device.

In the embodiment of the present application, since terminal devices are divided according to SSB indexes or areas where the terminal devices are located, different TAs are used for terminal devices corresponding to different SSB indexes or different areas. Therefore, for terminal devices corresponding to each SSB index or each area, a distance difference between the terminal devices closest to and farthest from the network device is smaller than a distance difference between the terminal devices closest to and farthest from the network device in the whole cell, and accordingly, a maximum delay difference can also be significantly reduced. In this way, the length of the receiving window used by the network device to receive the preamble can be reduced, implementation complexity of the network device is reduced, and the problem shown in FIG. 6 is avoided. Furthermore, the terminal devices with different SSB indexes or in different areas use different TAs to send a preamble, in this way, effective random access in the NTN system is implemented without increasing the length of the receiving window.

In the random access procedure, the terminal device selects a PRACH resource, i.e., RO, based on a configuration of the network device, and determines the target TA according to the foregoing method so as to use the target TA to adjust its own uplink timing and then send Msg 1 or Msg A.

For each RO, the network device starts a receiving window for receiving a preamble at a time domain position corresponding to the RO. The network device receives the preamble within the receiving window corresponding to the RO, and determines a TA adjustment amount for the terminal device based on a time difference between sending time and receiving time of the preamble. The TA adjustment amount is caused by a deviation between a position where the terminal device is located and a position of a reference point of the common TA and a distance between the position where the terminal device is located and the satellite. After determining the TA adjustment amount, the network device may send the TA adjustment amount specific to the terminal device through the RAR.

For the 4-step random access, the terminal device may receive Msg 2 in the 4-step random access procedure sent by the network device, where Msg 2 includes the TA adjustment amount. The terminal device determines its initial TA according to the TA adjustment amount and the common TA corresponding to the target area.

Further, the terminal device may send a third message, i.e., Msg 3, in the 4-step random access procedure to the network device according to a TA corresponding to the target area and the TA adjustment amount, where Msg 3 includes TA information, and the TA information includes a TA corresponding to the target area, or includes a sum of the TA corresponding to the target area and the TA adjustment amount. The TA information may be a TA value, a TA index, or other representations.

Figure 10:
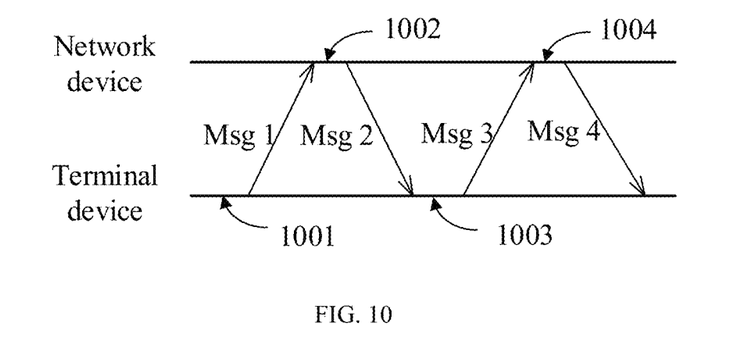
FIG. 10 is a schematic flowchart of applying the method shown in FIG. 7 in the 4-step random access procedure.

For example, FIG. 10 shows a 4-step random access procedure, where:

In 1001, a terminal device determines a target TA.

The terminal device sends Msg 1 using the target TA.

In 1002, a network device determines a TA adjustment amount for the terminal device according to Msg 1.

The network device sends the TA adjustment amount to the terminal device through Msg 2.

In 1003, the terminal device adjusts the target TA based on the TA adjustment amount.

The terminal device carries the target TA in Msg 3, or carries an adjusted TA, i.e., an initial TA.

In 1004, the network device knows a TA of the terminal device.

For the 2-step random access, the terminal device may receive Msg B in the 2-step random access procedure sent by the network device, where Msg B includes the TA adjustment amount. Msg A may include TA information, where the TA information is a TA corresponding to the target area, and the TA information may be a TA value, a TA index, or other representations. After receiving Msg A, the network device may know a TA used by the terminal device.

Figure 11:
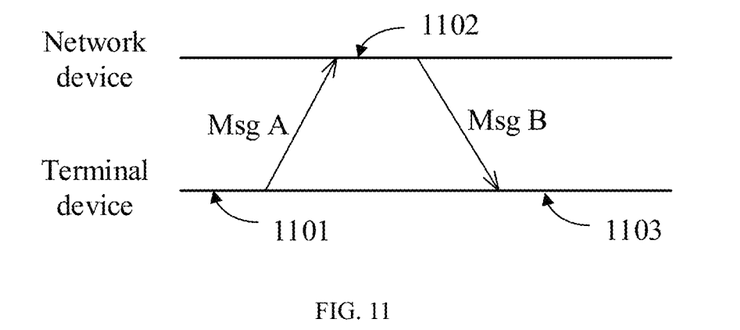
FIG. 11 is a schematic flowchart of applying the method shown in FIG. 7 in the 2-step random access procedure.

For example, a 2-step random access procedure as shown in FIG. 11, where:

In 1101, a terminal device determines a target TA.

The terminal device sends Msg A using the target TA.

In 1102, a network device learns the target TA, and determines a TA adjustment amount for the terminal device according to Msg A.

In 1103, the terminal device adjusts the target TA based on the TA adjustment amount.

In this way, the network device and the terminal device have consistent understanding of TA.

It should be noted that, the embodiments and/or technical features of the embodiments described in the present application may be combined with each other arbitrarily when no conflict exist, and technical solutions obtained after combination should also belong to the protection scope of the present application.

In various embodiments of the present application, size of a sequence number of each process does not mean an execution sequence, and the execution sequence of each process should be determined by its function and internal logic, and should not be limited to the implementation process of the embodiments of the present application.

The random access method according to the embodiments of the present application is described in detail above, and an apparatus for random access according to an embodiment of the present application is described below with reference to FIG. 9. The technical features described in the method embodiments are applicable to the following apparatus embodiments.

It should be understood that, in order to implement the foregoing functions, the apparatus includes a hardware structure and/or a software module corresponding to the implementation of each function. A person skilled in the art should readily recognize that the present application can be implemented in hardware or a combination of hardware and computer software in combination with illustrative units and algorithm steps described in the disclosed embodiments herein. Whether a certain function is executed in hardware or computer software driving hardware depends on a specific application and design constraints of the technical solution. Professionals may use different methods for each particular application to implement the described functions, but such implementations should not be considered to be beyond the scope of the present application.

The present application can divide functional units of the apparatus according to the above method, for example, it may be divided into units according to various functions, or two or more functions may be integrated into one unit. The integrated units may be implemented in a form of hardware or in a form of software functional units. It should be noted that, the division of the units in the present application is illustrative, and is merely a logical function division, and there may be other division manners in an actual implementation.

Figure 12:
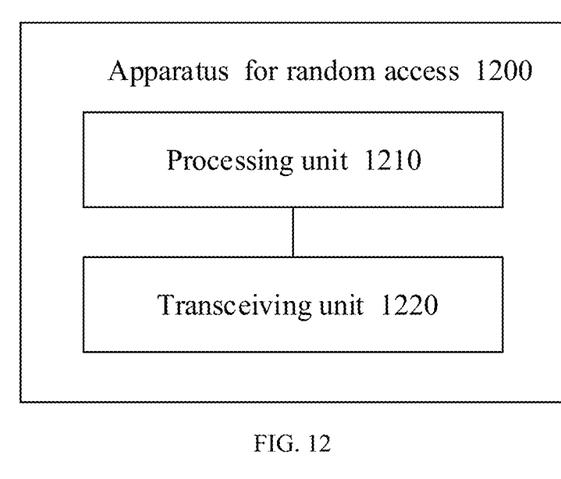
FIG. 12 is a schematic block diagram of an apparatus for random access according to an embodiment of the present application.

FIG. 12 is a schematic block diagram of an apparatus for random access 1200 according to an embodiment of the present application. As shown in FIG. 12, the apparatus 1200 includes a processing unit 1210 and a transceiving unit 1220.

The processing unit 1210 is configured to determine a target timing advance (TA) in a plurality of TAs according to first information, where the first information is associated with a synchronization signal block (SSB) received by the terminal device and/or is associated with an area where the terminal device is located.

The transceiving unit 1220 is configured to send a first message in a random access procedure to a network device according to the target TA.

Since terminal devices are divided according to SSB indexes or areas where the terminal devices are located, different TAs are used for the terminal devices corresponding to different SSB indexes or different areas. Therefore, for terminal devices corresponding to each SSB index or each area, a distance difference between the terminal devices closest to and farthest from the network device is smaller than a distance difference between the terminal devices closest to and farthest from the network device in the whole cell, and accordingly, a maximum delay difference can also be significantly reduced. In this way, the length of the receiving window for the network device to receive a preamble can be reduced, implementation complexity of the network device is reduced, and the problem shown in FIG. 6 is avoided.

Furthermore, the terminal devices with different SSB indexes or in different areas use different TAs to send the preamble, in this way, effective random access in the NTN system is implemented without increasing the length of the receiving window.

In an embodiment, the first information includes an SSB index of the SSB, and the plurality of TAs respectively correspond to a plurality of SSB indexes, where the processing unit 1210 is specifically configured to determine that a TA corresponding to the SSB index is the target TA according to the SSB index and a corresponding relationship between the plurality of TAs and the plurality of SSB indexes.

In an embodiment, the SSB includes a PBCH, and the PBCH carries the SSB index.

In an embodiment, a measurement value of the SSB is greater than a preset threshold.

In an embodiment, the measurement value of the SSB includes a measurement value of RSRP and/or RSRQ of the SSB.

In an embodiment, the transceiving unit 1220 is further configured to: receive indication information sent by the network device, where the indication information is used for indicating the corresponding relationship; or the processing unit 1210 is further configured to acquire the corresponding relationship which is pre-stored.

In an embodiment, a cell where the terminal device is located includes a plurality of areas, the plurality of TAs respectively correspond to the plurality of areas, the first information includes a target area where the terminal device is located in the plurality of areas, and the terminal device is a terminal device with a positioning capability. The processing unit 1210 is specifically configured to determine that a TA corresponding to the target area is the target TA according to the target area and a corresponding relationship between the plurality of TAs and the plurality of areas.

In an embodiment, the plurality of areas are coverage areas of a plurality of SSBs with different SSB indexes respectively.

In an embodiment, the processing unit 1210 is further configured to acquire information of the plurality of areas from a satellite ephemeris or a network device.

In an embodiment, the transceiving unit 1220 is further configured to: receive indication information sent by the network device, where the indication information is used for indicating the corresponding relationship; or the processing unit 1210 is further configured to acquire the corresponding relationship which is pre-stored.

In an embodiment, the transceiving unit 1220 is further configured to receive a second message in the random access procedure sent by the network device, where the second message includes a TA adjustment amount.

In an embodiment, the random access procedure is a 4-step random access procedure, and the transceiving unit 1220 is further configured to send a third message in the 4-step random access procedure to the network device according to the target TA and the TA adjustment amount, where the third message includes TA information, and the TA information includes the target TA or includes a sum of the target TA and the TA adjustment amount.

In an embodiment, the TA information is a TA value or a TA index.

In an embodiment, the random access procedure is a 2-step random access procedure, the first message includes TA information, and the TA information includes the target TA.

In an embodiment, the TA information is a TA value or a TA index.

It should be understood that, for a specific manner in which the apparatus 1200 performs random access and a resulting beneficial effect, reference may be made to the related description in the method embodiments.

Figure 13:
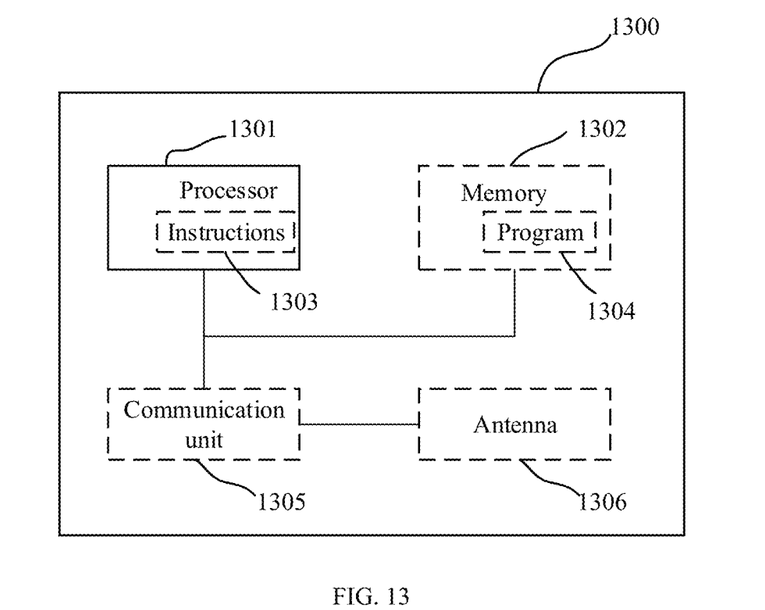
FIG. 13 is a schematic structural diagram of a random access device according to an embodiment of the present application.

FIG. 13 shows a schematic structural diagram of a random access device provided by the present application. A dotted line in FIG. 13 indicates that a unit or a module is optional. A device 1300 may be configured to implement the method described in the foregoing method embodiments. The device 1300 may be a terminal device or a network device or a chip.

The device 1300 includes one or more processors 1301, which may support the device 1300 to implement the method in the method embodiments corresponding to FIG. 2 to FIG. 8. The processor 1301 may be a general purpose processor or a special purpose processor. For example, the processor 1301 may be a central processing unit (CPU). The CPU may be configured to control the device 1300, execute a software program, and process data of the software program. The device 1300 may further include a communication unit 1305, configured to implement input (receiving) and output (sending) of signals.

For example, the device 1300 may be a chip, the communication unit 1305 may be an input and/or output circuit of the chip, or the communication unit 1305 may be a communication interface of the chip, and the chip may be used as an integral part of the terminal device or the network device or other wireless communication devices.

For another example, the device 1300 may be a terminal device or a network device, the communication unit 1305 may be a transceiver of the terminal device or the network device, or the communication unit 1305 may be a transceiver circuit of the terminal device or the network device.

The device 1300 may include one or more memories 1302, on which a program 1304 is stored, and the program 1304 may be executed by the processor 1301 to generate instructions 1303, so that the processor 1301 executes the method described in the foregoing method embodiments according to the instructions 1303. In an embodiment, data may also be stored in the memory 1302. In an embodiment, the processor 1301 may also read data stored in the memory 1302, where the data may be stored in the same storage address as the program 1304, and the data may also be stored in a different storage address than the program 1304.

The processor 1301 and the memory 1302 may be individually arranged, or integrated together, for example, on a system on chip (SOC) of the terminal device.

The device 1300 may further include an antenna 1306. The communication unit 1305 is configured to implement a transceiving function of the device 1300 through the antenna 1306.

For a specific manner in which the processor 1301 executes a communication method, reference may be made to the related description in the method embodiments.

It should be understood that, each step of the foregoing method embodiments may be implemented by a logic circuit in a form of hardware or an instruction in a form of software in the processor 1301. The processor 1301 may be a CPU, a digital signal processor (DSP), an application specific integrated circuit (ASIC), a field programmable gate array (FPGA), or other programmable logic devices such as a discrete gate, a transistor logic device, or a discrete hardware component.

The present application further provides a computer program product, and the computer program product is executed by a processor 1301 to implement the method described in any method embodiment of the present application.

The computer program product may be stored in a memory 1302, which, for example, is a program 1304, and the program 1304 is finally converted into an executable target file that can be executed by the processor 1301 through processes such as preprocessing, compilation, assembly, and linking, etc.

The present application further provides a computer readable storage medium having a computer program stored thereon, and the computer program is executed by a computer to implement the method described in any method embodiment of the present application. The computer program may be an advanced language program or an executable target program.

The computer readable storage medium is, for example, a memory 1302. The memory 1302 may be a volatile memory or a non-volatile memory, or the memory 1302 may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), which serves as an external cache. Description is illustrative but not restrictive, RAM in many forms are available, such as a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchlink dynamic random access memory (SLDRAM) and a direct rambus random access memory (DR RAM).

A person skilled in the art can clearly understand that, for the convenience and simplicity of description, for a specific working process and a resulting technical effect of the apparatus and device described above, reference may be made to the corresponding process and technical effects in the foregoing method embodiments, and details are not described herein again.

In the embodiments of the present application, the disclosed systems, apparatuses and methods may be implemented in other manners. For example, some features of the method embodiments described above may be ignored or not performed. The apparatus embodiments described above are merely illustrative, and the division of the units is merely a logical function division, and there may be other division manners in an actual implementation, and a plurality of units or components may be combined or integrated into another system. In addition, the coupling between the units or the coupling between the components may be direct coupling or indirect coupling, and the coupling includes an electrical connection, a mechanical connection or other forms of connections.

In addition, the terms "system" and "network" in the embodiments of the present application are often used interchangeably. The term "and/or" is merely an association relationship describing associated objects, and indicates that there may be three relationships, for example, A and/or B, which may indicate that there are three cases: A alone, both A and B, and B alone. The character "/" generally indicates that the associated objects before and after are of an "or" relationship.

In the embodiment of the present application, "B corresponding to A" indicates that B is associated with A, and B can be determined according to A. It should also be understood that determining B according to A does not mean determining B only according to A, which can also means determining B according to A and/or other information.

In summary, the above is only preferred embodiments of the technical solution of the present application, which is not intended to limit the protection scope of the present application. Any amendments, equivalent replacements and improvements made within the spirit and principle of the present application shall all belong to the protection scope of the present application.

What is claimed is:

1. A random access method, wherein the method comprises:
   determining, by a terminal device in a non-terrestrial network (NTN) system, a target timing advance (TA) in a plurality of TAs according to first information, wherein the first information is associated with an area where the terminal device is located; and
   sending, by the terminal device, a first message in a random access procedure to a network device according to the target TA;
   wherein a cell where the terminal device is located comprises a plurality of areas, the plurality of TAs respectively correspond to the plurality of areas, the first information comprises a target area where the terminal device is located in the plurality of areas, and the terminal device is a terminal device with a positioning capability, wherein the plurality of areas are coverage areas of a plurality of synchronization signal blocks (SSBs) with different SSB indexes respectively;
   wherein the determining, by the terminal device, the TA in the plurality of TAs according to the first information comprises:
   receiving, by the terminal device, indication information sent by the network device. wherein the indication information is used for indicating a corresponding relationship between the plurality of TAs and the plurality of areas;
   determining, by the terminal device, that a TA corresponding to the target area is the target TA according to the target area and the corresponding relationship;
   wherein the method further comprises:
   acquiring, by the terminal device, information of the plurality of areas from the network device;
   determining, by the terminal device, a position of the terminal device based on the positioning capability;
   determining, by the terminal device, the target area based on the information of the plurality of areas and the position of the terminal device.

2. The method according to claim 1, wherein the method further comprises:
   receiving, by the terminal device, a second message in the random access procedure sent by the network device, wherein the second message comprises a TA adjustment amount.

3. The method according to claim 2, wherein the random access procedure is a 4-step random access procedure, and the method further comprises:
   sending, by the terminal device, a third message in the 4-step random access procedure to the network device according to the target TA and the TA adjustment amount, wherein the third message comprises TA information, and the TA information comprises the target TA or a sum of the target TA and the TA adjustment amount.

4. The method according to claim 3, wherein the TA information is a TA value or a TA index.

5. The method according to claim 2, wherein the random access procedure is a 2-step random access procedure, the first message comprises TA information, and the TA information comprises the target TA.

6. The method according to claim 5, wherein the TA information is a TA value or a TA index.

7. An apparatus for random access, wherein the apparatus comprises a processor and a memory, the memory is configured to store a computer program, and the processor is configured to invoke and run the computer program stored in the memory, so as to:
   determine a target timing advance (TA) in a plurality of TAs according to first information, wherein the first information is associated with an area where a terminal device in a non-terrestrial network (NTN) system is located; and
   control an interface to send a first message in a random access procedure to a network device according to the target TA;
   wherein a cell where the terminal device is located comprises a plurality of areas, the plurality of TAs respectively correspond to the plurality of areas, the first information comprises a target area where the terminal device is located in the plurality of areas, and the terminal device is a terminal device with a positioning capability, wherein the plurality of areas are coverage areas of a plurality of synchronization signal blocks (SSBs) with different SSB indexes respectively;
   wherein the processor is configured to:
   control an interface to receive indication information sent by the network device, wherein the indication information is used for indicating a corresponding relationship between the plurality of TAs and the plurality of areas;
   determine that a TA corresponding to the target area is the target TA according to the target area and the corresponding relationship;
   wherein the processor is further configured to:
   acquire information of the plurality of areas from the network device;
   determine a position of the terminal device based on the positioning capability:

determine the target area based on the information of the plurality of areas and the position of the terminal device.

8. A non-transitory computer readable storage medium, wherein the computer readable storage medium is configured to store a computer program, and the computer program causes a computer to:
determine a target timing advance (TA) in a plurality of TAs according to first information, wherein the first information is associated with an area where a terminal device in a non-terrestrial network (NTN) system is located; and
send a first message in a random access procedure to a network device according to the target TA;
wherein a cell where the terminal device is located comprises a plurality of areas, the plurality of TAs respectively correspond to the plurality of areas, the first information comprises a target area where the terminal device is located in the plurality of areas, and the terminal device is a terminal device with a positioning capability, wherein the plurality of areas are coverage areas of a plurality of synchronization signal blocks (SSBs) with different SSB indexes respectively;
wherein the determining a target timing advance (TA) in a plurality of TAs according to first information comprises:
receiving indication information sent by the network device, wherein the indication information is used for indicating a corresponding relationship between the plurality of TAs and the plurality of areas;
determining that a TA corresponding to the target area is the target TA according to the target area and the corresponding relationship;

wherein the method further comprises:
acquiring information of the plurality of areas from the network device;
determining a position of the terminal device based on the positioning capability:
determining the target area based on the information of the plurality of areas and the position of the terminal device.

9. The apparatus according to claim 7, wherein the processor is further configured to:
control an interface to receive a second message in the random access procedure sent by the network device, wherein the second message comprises a TA adjustment amount.

10. The apparatus according to claim 9, wherein the random access procedure is a 4-step random access procedure, and the processor is further configured to:
send a third message in the 4-step random access procedure to the network device according to the target TA and the TA adjustment amount, wherein the third message comprises TA information, and the TA information comprises the target TA or a sum of the target TA and the TA adjustment amount.

11. The apparatus according to claim 10, wherein the TA information is a TA value or a TA index.

12. The apparatus according to claim 9, wherein the random access procedure is a 2-step random access procedure, the first message comprises TA information, and the TA information comprises the target TA.

13. The apparatus according to claim 12, wherein the TA information is a TA value or a TA index.

* * * * *